Oct. 24, 1961 J. K. FLOYD ET AL 3,005,863
DEFERRED ACTION BATTERY
Filed Sept. 12, 1958

INVENTORS
JAMES KERMIT FLOYD
CARL F. OESTERMEYER
BY
Edward J. Dwyer
ATTORNEY

United States Patent Office 3,005,863
Patented Oct. 24, 1961

3,005,863
DEFERRED ACTION BATTERY
James Kermit Floyd, Euclid, and Carl F. Oestermeyer, Shaker Heights, Ohio, assignors to The Electric Storage Battery Company, a corporation of New Jersey
Filed Sept. 12, 1958, Ser. No. 760,603
11 Claims. (Cl. 136—90)

The present invention generally relates to electric batteries. More specifically, the present invention is concerned with deferred action batteries of the type in which the electrolyte is stored in a reservoir out of contact with the plates of the battery until it is desired to activate the battery.

Since, in a deferred action battery, the electrolyte is stored apart from the plates of the battery until the battery is activated, deferred action batteries are particularly adapted for applications requiring prolonged storage in a charged state. In this manner, premature loss of charge and deterioration of the battery components as a result of chemical attack by the electrolyte is prevented. Such batteries, however, must be adapted for instantaneous activation by the transfer of the electrolyte from the storage reservoir to the cell compartments of the battery. It is, therefore, an object of the present invention to provide a new and improved electrolyte storage reservoir and transfer means for a deferred action battery.

Another object of the present invention is to provide means operative to achieve positive and rapid transfer of the electrolyte from the storage reservoir to the cell compartments of a deferred action battery.

Still another object of the present invention is to utilize a collapsible bellows as an electrolyte storage reservoir.

A further object of the present invention is to provide an electrolyte transfer means for a deferred action battery that can be operated by a vacuum derived from an evacuated battery casing, external gas pressure, or a combination of vacuum and gas pressure.

A still further object of the present invention is to provide a new and improved means for rupturing the separation between the cell compartments and the electrolyte reservoir in a deferred action battery when it is desired to activate the battery.

Another further object of the present invention is to provide means for drawing the rupturing means into the battery casing out of the electrolyte flow path between the electrolyte reservoir and the cell compartments of the battery in such a manner that it acts as a baffle for directing the flow of electrolyte into said compartments.

In accordance with the present invention, the cell compartments of a deferred action battery are connected to an electrolyte reservoir by means of a manifold which overlies the cell compartments and which has flow passages communicating with each cell compartment. The electrolyte reservoir comprises a collapsible bellows which overlies the manifold and which is separated therefrom by means of a rupturable diaphragm. When the system is activated, this diaphragm is ruptured by means of a knife which is sealed within the electrolyte reservoir and connected to actuating means within the battery casing. The knife actuating means comprise a gas operated piston which is connected to the knife by means of a rod and which is activated by exploding an electric squib. Upon activation, the knife is drawn downward through the rupturable diaphragm and into the battery casing out of the electrolyte flow path between the manifold and the reservoir with the top of the knife acting as a baffle for directing the flow of electrolyte. The electrolyte reservoir is surrounded by an outer gas tight casing which houses a gas generating squib adapted to be fired simultaneously with or slightly after the firing of the squib used to drive the knife actuating piston. The firing of this squib builds up a gas pressure within the outer casing which collapses the bellows to expel the electrolyte therefrom and drive it into the manifold and cell compartments of the battery. The bellows may also be collapsed to drive the electrolyte into the battery casing by maintaining the interior of the battery casing under vacuum or by a combination of both vacuum and gas pressure.

A better understanding of the present invention may be had from the following description when read with reference to the accompanying drawings of which:

Figure 1:
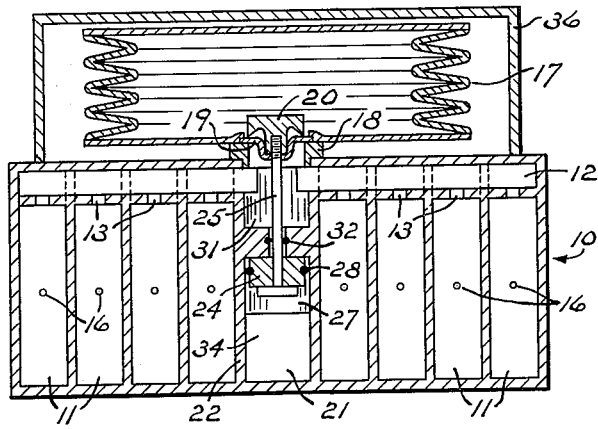
FIG. 1 is a sectional front elevation of an embodiment of the present invention.
Figure 2:
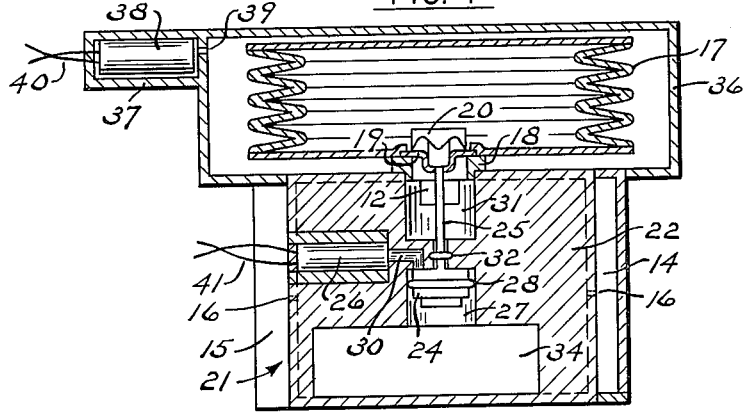
FIG. 2 is a sectional side elevation of the embodiment of the present invention shown in FIG. 1.
Figure 3:
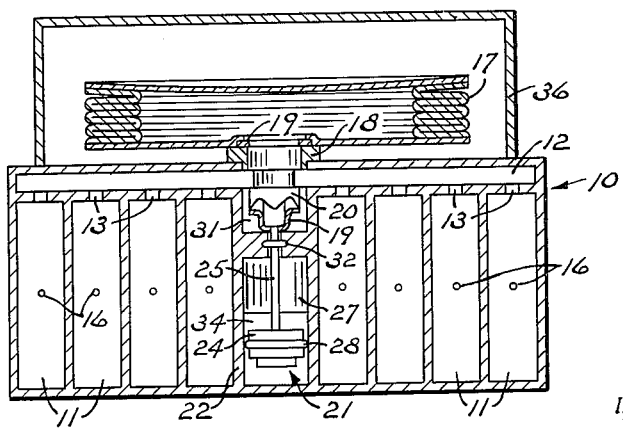
FIG. 3 is a sectional side elevation of the embodiment of the present invention shown in FIGS. 1 and 2 after activation.

Referring now to the drawings, the numeral 10 designates a battery casing have a plurality of cell compartments 11. Each of the cell compartments 11 is adapted to house the plates and separators which constitute the individual cells of the battery. In an effort to simplify the disclosure of the present invention, and since plates and separators are well known in the battery art, these have not been illustrated in the drawings. A manifold 12 overlies the cell compartments 11 and communicates with each compartment by means of the flow passages 13, there being at least one flow passage for each compartment. While the flow passages have been shown as being symmetrically located along the center line of the manifold 12, it will be understood by those skilled in the art, that the flow passages 13 may be staggered with respect to the center line of the manifold 12 in order to achieve some optimum rate or pattern of electrolyte flow into the cell compartments.

The numerals 14 and 15 designate exhaust chambers which are located along the side of the battery casing 10 adjacent to the ends of the cell compartments 11. While not shown in the drawings, a third exhaust chamber complementary to the exhaust chamber 15 is located on the same side of the battery casing 10 as the exhaust chamber 15 to the left of its center. The exhaust chambers communicate with each of the cell compartments 11 by means of exhaust ports 16 located in the ends of the cell compartments 11. The function of these exhaust compartments is to provide a volume into which the air within the battery casing 10 may be exhausted when displaced by the battery electrolyte upon activation of the system. In this respect, it has been found that for optimum battery performance, the total volume of the exhaust chambers should be approximately one-half to one times the total volume of electrolyte to be displaced. Still further, it has been found that the exhaust ports 16 connecting the cell compartments 11 with the exhaust chambers should be approximately one-fifth the diameter of the electrolyte of the flow passages 13 connecting the cell compartments 11 with the manifold 12. As will be explained in more detail hereinafter, the exhaust chambers and the exhaust ports are not necessary when this system is activated in part by maintaining the battery casing 10 under vacuum.

Upon activation of the battery of the present invention, the manifold 12 serves as a conduit channeling electrolyte from an electrolyte reservoir 17 into the cell compartments 11. As shown, the electrolyte reservoir 17 is a collapsible bellows which, for reasons to be described hereinafter, is preferably metallic. The reservoir 17 overlies the battery manifold 12 and is supported on the battery casing 10 by means of a bushing 18. The bushing 18 also serves as a flow channel between the reservoir 17 and the manifold 12. The reservoir 17 is separated from the manifold 12 by means of a rupturable diaphragm 19 in the bottom wall of the bellows.

A knife 20, sealed within the bellows, is provided for rupturing the diaphragm 19 upon the activation of the battery. As shown, the knife 20 is circular in shape and is sealed in the diaphragm 19 in a position to be drawn downwardly therethrough.

To activate the knife 20, knife actuating means designated generally as 21 are provided in the battery casing 10. The knife actuating means 21, which comprises the piston 24, the rod 25, which connects the piston 24 with the knife 20, and an electric squib 26, are housed in a block 22 located in the battery casing 10 directly under the rupturable diaphragm 19 of the electrolyte reservoir 17. The piston 24 is adapted to be driven in a cylinder 27, which is cut in the block 22 by means of gas pressure generated by the ignition of the electric squib 26. It will be understood by those skilled in the art, that the electric squib 26 may be of the force and heat generating type or of the gas generating type. The former of these two types of squibs operates in this application by rapidly heating the air adjacent thereto causing the same to expand and in that manner, build up a gas pressure to drive the gas piston 24. If the electric squib 26 is of the gas generatnig type, the system will be operated by the gas generated by the energization of the squib. As shown, the electric squib 26 is also mounted in the block 22 and communicates with the top of the piston 24 and the cylinder 27 by means of the gas passage 30. To assure a gas tight fit between the piston 24 and the walls of the cylinder 27, the piston 24 is provided with an O ring gasket 28. The rod 25, which connects the piston 24 with the knife 20, is provided with an O ring gasket 32 where it passes through the block 22 to prevent gas from the cylinder 27 from entering the manifold 12. A recess 31 is provided in the block 22 below the manifold 12 into which the knife 20 may be drawn to remove it from the electrolyte flow path between the manifold 12 and the electrolyte reservoir 17. The recess 31 is cut to a depth such that when the knife 20 seats therein, the top of the knife is flush with the bottom of the manifold 12. In this position, the top of the knife 20 acts as a baffle that directs the electrolyte into the manifold 12. It will be obvious to those skilled in the art, that the top surface of the knife 20 may be shaped so as to provide a contoured path for deflecting electrolyte into the manifold 12. When the knife 20 is seated in the recess 31, the piston 24 is at the bottom of its stroke in which position it has moved out of the cylinder 27 and into a gas exhaust chamber 34 in the block 22.

Upon the rupture of the diaphragm 19, the electrolyte within the reservoir 17 is free to flow into the manifold 12 and the cell compartments 11 if the battery is in an upright position. To provide for positive activation of the battery in all positions and to insure rapid transfer of the electrolyte from the reservoir 17 into the cell compartments 11 of the battery under all conditions, means have been provided to drive electrolyte out of the reservoir 17 and into the cell compartments. To this end, the electrolyte reservoir 17 is surrounded by an outer gas tight casing 36. Connected to the outer casing 36 is a squib housing 37 containing a gas generating electric squib 38. The interior of the squib housing 37 communicates with the interior of the casing 36 by means of a gas port 39. The gas generating electric squib 38 has lead wires 40 passing through the squib housing 37 which are adapted to be connected to a suitable source of energizing current. Upon the energization of the gas squib 38, the gas generated will pass through the port 39 and into the outer casing 36 applying pressure against the outer surfaces of the reservoir 17 causing it to collapse and to drive the electrolyte into the manifold 12 and the cell compartments of the battery.

In operation it is desirable that the gas pressure applied to the outer surfaces of the reservoir 17 by the ignition of the gas generating squib 38 is not applied thereto until the knife 20 has ruptured the diaphragm 19. This can be accomplished in several ways. For example, the gas generating squib 38 may be energized after the energization of the electric squib 26 by means of an appropriate firing or electric delay circuit. Another method of obtaining the desired sequence of operation is to employ squibs having different time constants. In this manner, the lead wires 40 of the gas generating squib 38 and the lead wires 41 of the electric squib 26 may be connected in parallel to a single source of squib energizing current. By choosing squibs having the desired characteristics, the gas pressure generated by the gas generating squib 38 will not reach its maximum pressure until the knife 20 has ruptured the diaphragm 19 and seated in the recess 31. Operation in this mode has the advantage that the gas pressure within the outer casing 36 reaches its maximum after the electrolyte reservoir 17 has started collapsing and thus the reservoir 17 acts as a cushion absorbing in part the force of the pressure built up. The time delay necessary to achieve the type of operation is on the order of milli-seconds. Batteries built in accordance with the teachings of the present invention have been activated and reached their minimum operation voltage in as little as 35 milli-seconds.

The bellows type electrolyte reservoir of the present invention may also be collapsed to drive the electrolyte therefrom by maintaining the battery casing 10 under vacuum. When the battery casing 10 is maintained under vacuum, the outer casing 36 and the gas generating squib 38 may be eliminated and the reservoir 17 subjected to atmospheric pressure. In addition, the exhaust chambers and the exhaust ports in the battery casing may also be eliminated. However, the presence of the exhaust ports and exhaust chamber does not adversely affect the operation of the battery since they, too, would be under vacuum. When the battery casing 10 is maintained under vacuum, the rupturing of the diaphragm 19 by means of the knife 20 subjects the internal surfaces of the reservoir 17 to the vacuum within the battery casing 10. This vacuum in combination with atmospheric pressure acting on the outer surfaces of the reservoir 17 will cause it to collapse and to drive the electrolyte into the battery casing 10. From the foregoing, it will be obvious to those skilled in the art, that if it is desired, a combination of gas pressure and vacuum may be employed. In such a mode of operation, the outer casing 36 and the gas generating squib 38 cooperate to provide a pressure on the reservoir 17 which is much greater than atmospheric pressure.

From the foregoing description, it can be seen that the novel structure described permits the battery of the present invention to be activated by means of a vacuum, gas pressure, or a combination of both vacuum and gas pressure. This structure also provides a relatively simple means for effectively and substantially instantaneously transferring the electrolyte from the electrolyte reservoir 17 to the cell compartments of the battery. Moreover, it should be observed that the knife means utilized to rupture the diaphragm 19 serves the additional function of a baffle directing electrolyte flow into the manifold 12. This is accomplished by drawing the knife means out of the reservoir and into the battery casing. In addition, by having the knife actuating means within the battery casing and the knife sealed within the electrolyte chamber, the electrolyte chamber can be stored separate from the battery casing and mounted by screwing the knife on to the threaded rod 25.

The bellows configuration utilized for the electrolyte reservoir provides two important features. First, it provides an electrolyte reservoir which can be collapsed to expel the electrolyte therefrom and, secondly, the bellows can readily be made of metals such as oxygen-free copper or stainless steel. This latter feature is particularly important where the battery of the present invention may be subject to low ambient temperatures which could adversely affect the voltage and current characteristics of the battery, and it may be desirable to heat the electrolyte prior to battery activation. To this end, suitable heating means, which may be either electrical or chemical in nature, may be utilized to surround the reservoir 17 and if it is metallic, very efficient heat transfer will be accomplished between the heating means and the electrolyte within the electrolyte reservoir 17 and thereby, eliminating the need for interposing a heat exchanger between the battery casing and the electrolyte reservoir.

Having described the present invention, that which is claimed as new is:

1. A deferred action battery comprising, in combination, a battery casing having at least one cell compartment, an electrolyte reservoir comprising collapsible bellows connected to said battery casing, said reservoir being separated from said battery casing by a rupturable diaphragm, knife means sealed in said reservoir for rupturing said diaphragm, electric squib operating means in said battery casing for drawing said knife through said diaphragm and into said battery casing, and means for forcing said electrolyte into said casing.

2. Apparatus as specified in claim 1 wherein said last named means comprise an outer casing surrounding said reservoir and a gas generating electric squib for applying pressure to said reservoir.

3. Apparatus as specified in claim 2 wherein said electric squib and said gas generating electric squib are adapted to be energized simultaneously, the maximum pressure generated by said gas generating squib being obtained after said electric squib operating means has ruptured said diaphragm.

4. In combination, a battery casing having a plurality of cell compartments, a manifold overlying said cell compartments and having flow passages communicating with said cell compartments, a collapsible metallic electrolyte reservoir in communication with said manifold, rupturable means sealed separating said electrolyte reservoir from said manifold, knife means in said reservoir for rupturing said last named means, knife operating means in said battery casing for causing said knife to rupture said rupturable means, said knife operating means being actuated by an electric squib, and means for exerting pressure on said reservoir for causing it to collapse when said knife means are actuated.

5. In combination, a battery casing having a plurality of cell compartments, a manifold overlying said cell compartments and having flow passages communicating with each of said cell compartments, each of said flow passages being in individual communication with each of said cell compartments, an electrolyte reservoir comprising a collapsible metallic bellows in communication with said manifold, rupturable means separating said electrolyte reservoir from said manifold, knife means in said reservoir for rupturing said rupturable means, and electric squib operated knife means in said battery casing for causing said knife to rupture said rupturable means, an outer casing surrounding said reservoir, and means in said outer casing for exerting pressure on said reservoir for causing it to collapse when said knife means are actuated.

6. Apparatus as specified in claim 5 wherein said last named means is a gas generating squib.

7. In combination, a battery casing having a plurality of cell compartments, a manifold overlying said cell compartments and having flow passages in its bottom communicating with each of said cell compartments, each of said flow passages being in individual communication with each of said cell compartments, an electrolyte reservoir comprising a collapsible bellows in communication with said manifold, rupturable means separating said electrolyte reservoir from said manifold, knife means in said reservoir for rupturing said rupturable means, knife operating means in said battery casing below said manifold connected to said knife for causing said knife to rupture said rupturable means, first gas generating means in said battery casing for actuating said knife operating means, an outer casing surrounding said reservoir, and second gas generating means in said outer casing for collapsing said bellows, said first and second gas generating means being adapted for simultaneous actuation.

8. Apparatus as specified in claim 7 wherein said knife operating means comprise a piston connected to said knife by means of a rod.

9. A filling device for a deferred action battery of the type having a plurality of cell compartments interconnected by means of a manifold overlying said cell compartments and having flow passages communicating with said cell compartments and adapted to be filled with electrolyte when said battery is placed in service comprising, in combination, an electrolyte reservoir comprising a collapsible metallic bellows adapted to be filled with electrolyte, said bellows overlying said manifold, a rupturable diaphragm separating said electrolyte reservoir from said manifold, knife means in said reservoir, a piston in said battery casing below said manifold, means connecting said piston to said knife, said piston being adapted to be operated by gas pressure to draw said knife through said rupturable diaphragm and into said battery casing out of the path of the flow of electrolyte between said reservoir and said manifold so as to form a baffle in said casing directing electrolyte into said manifold, and gas generating means for actuating said piston.

10. Apparatus as specified in claim 9 wherein said reservoir is surrounded by an outer casing having therein a second gas generating means for generating gas pressure within said outer casing to collapse said electrolyte reservoir.

11. Apparatus as specified in claim 9 wherein said battery casing is maintained under vacuum, said vacuum collapsing said reservoir when said rupturable diaphragm is ruptured.

References Cited in the file of this patent

UNITED STATES PATENTS

| | | |
|---|---|---|
| 2,798,111 | Renke | July 2, 1957 |
| 2,824,164 | Bauman | Feb. 18, 1958 |
| 2,852,592 | Salauze | Sept. 16, 1958 |

FOREIGN PATENTS

| | | |
|---|---|---|
| 726,391 | Great Britain | Mar. 16, 1955 |